(12) United States Patent
Johannsen et al.

(10) Patent No.: US 8,453,499 B2
(45) Date of Patent: Jun. 4, 2013

(54) MOTOR SHAFT SPEED SENSOR ARRANGEMENT

(75) Inventors: Donald Orville Johannsen, Dubuque, IA (US); Frank Kukuczka, East Dubuque, IL (US); Jim Mechowski, Peoria, IL (US); Troy Olsen, Peoria, IL (US)

(73) Assignee: Deere & Company, Moline, IL (US)

( * ) Notice: Subject to any disclaimer, the term of this patent is extended or adjusted under 35 U.S.C. 154(b) by 234 days.

(21) Appl. No.: 12/921,283

(22) PCT Filed: May 29, 2008

(86) PCT No.: PCT/US2008/006786
§ 371 (c)(1),
(2), (4) Date: Dec. 14, 2010

(87) PCT Pub. No.: WO2009/126126
PCT Pub. Date: Oct. 15, 2009

(65) Prior Publication Data
US 2011/0185801 A1    Aug. 4, 2011

Related U.S. Application Data

(60) Provisional application No. 61/043,831, filed on Apr. 10, 2008.

(51) Int. Cl.
*G01M 17/013* (2006.01)
(52) U.S. Cl.
USPC ................................................... 73/115.08
(58) Field of Classification Search
USPC ...................................................... 73/115.08
See application file for complete search history.

(56) References Cited

U.S. PATENT DOCUMENTS

| | | | |
|---|---|---|---|
| 3,729,069 A | 4/1973 | Kleian et al. | |
| 3,947,711 A | 3/1976 | Presley | |
| 4,527,655 A | 7/1985 | Kline | |
| 4,984,455 A | 1/1991 | Koyama et al. | |
| 5,018,384 A | 5/1991 | Hayashi et al. | |
| 5,614,777 A | 3/1997 | Bitterly et al. | |
| 5,775,437 A | 7/1998 | Ichikawa et al. | |
| 6,082,195 A * | 7/2000 | Wallingford | 73/514.16 |
| 6,486,653 B2 | 11/2002 | Fornes et al. | |
| 6,675,640 B2 * | 1/2004 | Ehrlich et al. | 73/115.08 |
| 7,354,470 B2 | 4/2008 | Conrad | |

FOREIGN PATENT DOCUMENTS

| | | |
|---|---|---|
| EP | 0311853 A2 | 4/1989 |
| EP | 0426298 A1 | 5/1991 |
| EP | 0549452 A1 | 6/1993 |
| EP | 0584313 B1 | 4/1997 |
| EP | 0780597 A1 | 6/1997 |
| EP | 1347886 A1 | 10/2003 |
| EP | 1465733 A1 | 10/2004 |

OTHER PUBLICATIONS

International Preliminary Examination Report dated Oct. 21, 2010, (10 pages).
Background Information (1 page) (admitted as prior art before Apr. 10, 2008).
Eaton Hydraulics Technical Data Sheet, "Quadrature speed Sensor for Heavy Duty, Hydrostatic Fixed Displacement Piston Motors" (2 pages) (Mar. 2003).

* cited by examiner

*Primary Examiner* — Freddie Kirkland, III (57) ABSTRACT

A work vehicle (10) comprises a case (26), a motor (17) comprising a portion located outside the case (26) and a rotatable output shaft (18), and a speed sensor (34) located inside the case to sense information indicative of a speed of rotation of the output shaft (18).

20 Claims, 8 Drawing Sheets

MOTOR SHAFT SPEED SENSOR ARRANGEMENT

This application is a nationalization of International Application No. PCT/US2008/06786 which was filed on 29 May 2008 and claims priority to U.S. Provisional Application No. 61/043,831 filed on 10 Apr.2008.

FIELD OF THE DISCLOSURE

The present disclosure relates to a motor shaft speed sensor arrangement

BACKGROUND OF THE DISCLOSURE

The propulsion system of some skid steers has an engine which powers two independently operable drive mechanisms, one drive mechanism for the front and rear wheels on the left side of the vehicle and the other drive mechanism for the front and rear wheels on the right side of the vehicle. Each drive mechanism has a hydrostatic transmission, a chain drive, a final drive for front wheel, and a final drive for the rear wheel.

With respect to each drive mechanism, the transmission has a variable displacement pump, configured to pump hydraulic fluid in opposite directions, and a bi-directional fixed displacement motor that receives hydraulic fluid from the pump. The output shaft of the motor operates the chain drive located inside a chain case. The chain drive has a pair of chains, each chain being driven by a sprocket mounted to the motor output shaft. One chain drives the final drive associated with the front wheel, and the other chain drives the final drive associated with the rear wheel.

SUMMARY OF THE DISCLOSURE

According to an aspect of the present disclosure, there is provided a work vehicle comprising a case, a motor, a rotary sensor target, a magnetic speed sensor, and an adjustment device. The motor comprises a portion located outside the case and a rotatable output shaft. The rotary sensor target is located inside the case and mounted to the output shaft for rotation therewith. The magnetic speed sensor is located inside the case to sense a speed of rotation of the sensor target, such speed of rotation of the sensor target being indicative of a speed of rotation of the output shaft. The adjustment device is arranged to adjust the position of the speed sensor relative to the sensor target automatically.

According to another aspect of the present disclosure, a work vehicle comprises a case, a motor, a rotor, a magnetic speed sensor, and a wiper. The motor comprises a portion located outside the case and a rotatable output shaft. The rotor is located inside the case and is mounted to the output shaft to rotate therewith. The rotor comprises a sensor target. The magnetic speed sensor is located inside the case to sense a speed of rotation of the sensor target, such speed of rotation of the sensor target being indicative of a speed of rotation of the output shaft. The wiper is located inside the case and wipes the rotor to divert material away from the speed sensor.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
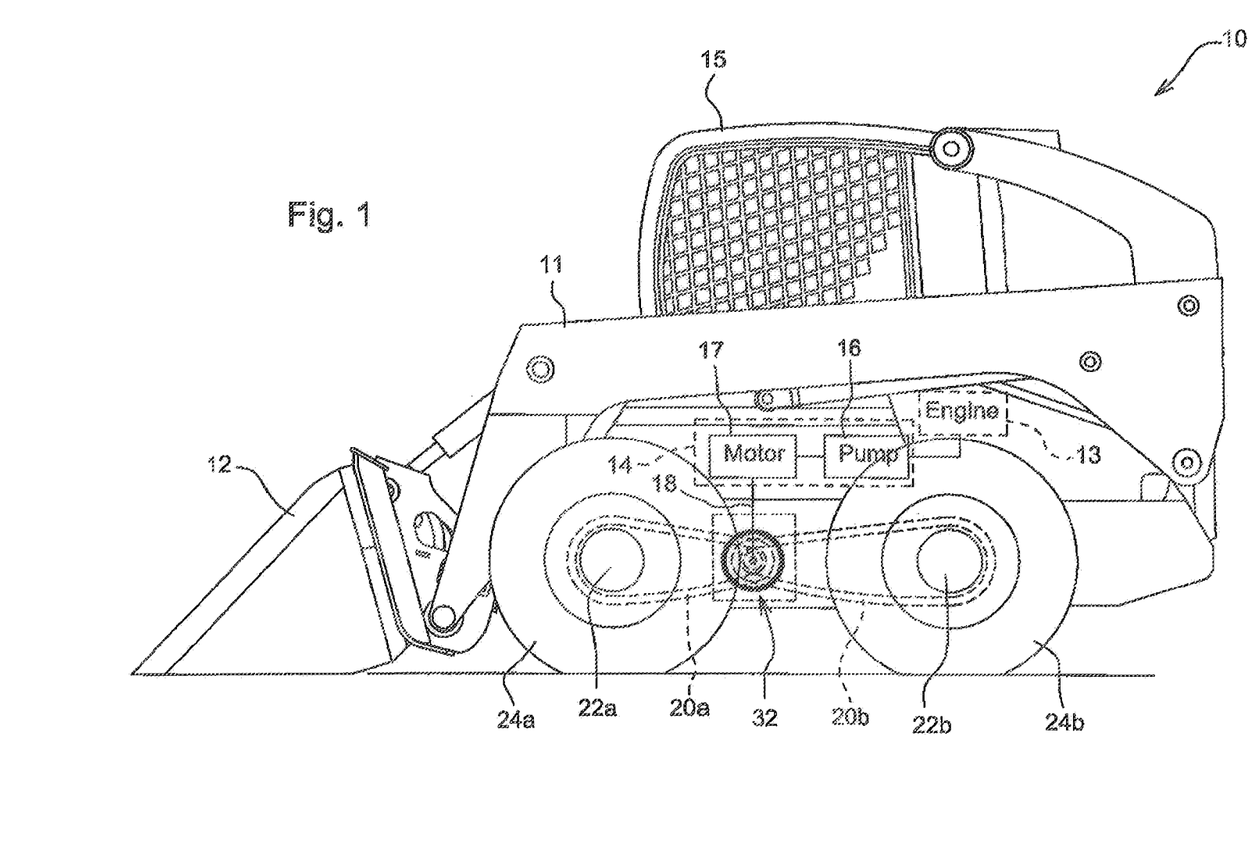
FIG. 1 is a side elevation view of an exemplary work vehicle (e.g., skid steer) showing, in phantom, two chains located inside a chain case and routed for rotation by an output shaft of a motor (e.g., hydraulic motor) and further showing a magnetic speed sensor unit for sensing a speed of rotation of the output shaft.

Referring to FIG. 1, there is shown an exemplary work vehicle 10, illustratively in the form of, for example, a skid steer (e.g., any of John Deere skid steer models 325,328, or 332 of the "single-speed" type, "single speed" meaning it has a single speed-range mode of, for example, 0-6 miles per hour) which may have a boom 11 for raising and lowering a tool 12 attached thereto. The work vehicle 10 has a propulsion-and-steering system for propelling and steering the vehicle 10. The propulsion-and-steering system may have an engine 13 operably coupled to two independently operable drive mechanisms, each drive mechanism configured to drive, for example, front and rear wheels 24a, 24b on a respective side of the vehicle 10 in a manner independent of the other drive mechanism. An operator may control operation of the propulsion-and-steering system from the operator's station 15 via left and right operator input devices (e.g., joysticks) (not shown) of the propulsion-and-steering system, one for each drive mechanism.

Each drive mechanism includes a hydrostatic transmission 14, a chain drive having front and rear chains 20a, 20b respectively associated with the front and rear wheels 24a, 24b, and front and rear final drives 22a, 22b respectively associated with the front and rear wheels 24a, 24b. Each chain 20a, 20b is, for example, an ANSI 100 size roller chain. Further exemplarily, on John Deere skid steer models 325 and 328, the front chain 20a has 52 pitches (Part No. KV 17817) (pitch being the distance from one pin of the roller chain to an adjacent pin of the roller chain) and the rear chain 20b has 66 pitches (Part No. KV 17818), and, on John Deere skid steer model 332, the front chain 20a has 56 pitches (Part No. KV 21971) and the rear chain 20b has 68 pitches (Part No. KV 20860). In other embodiments, a drive having belts, gears, or the like may be used in place of the chain drive.

Each transmission 14 has an electronically-controlled variable displacement pump 16 (e.g., swash plate-type axial piston pump), configured to pump hydraulic fluid in opposite directions, and a bi-directional fixed displacement hydraulic motor 17, one such transmission 14 being shown diagrammatically in FIG. 1. The engine 12 drives the pump 16 which, in turn, drives the motor 17. The rotatable output shaft 18 of the motor 17 is drivingly coupled to the chain drive of the respective drive mechanism. The front chain 20*a* is drivingly coupled to the final drive 22*a* of the front wheel 24*a*, and the rear chain 20*b* is drivingly coupled to the final drive 22*b* of the rear wheel 24*b*. Exemplarily, on John Deere single-speed skid steer models 325 and 328 , the motor 17 is a model TMTH574 (having a displacement of 574 cubic centimeters) available from Sauer-Danfoss, and, on the John Deere single-speed skid steer model 332 , the motor 17 is a model TMTH630 (having a displacement of 630 cubic centimeters) available from Sauer-Danfoss.

Figure 2:
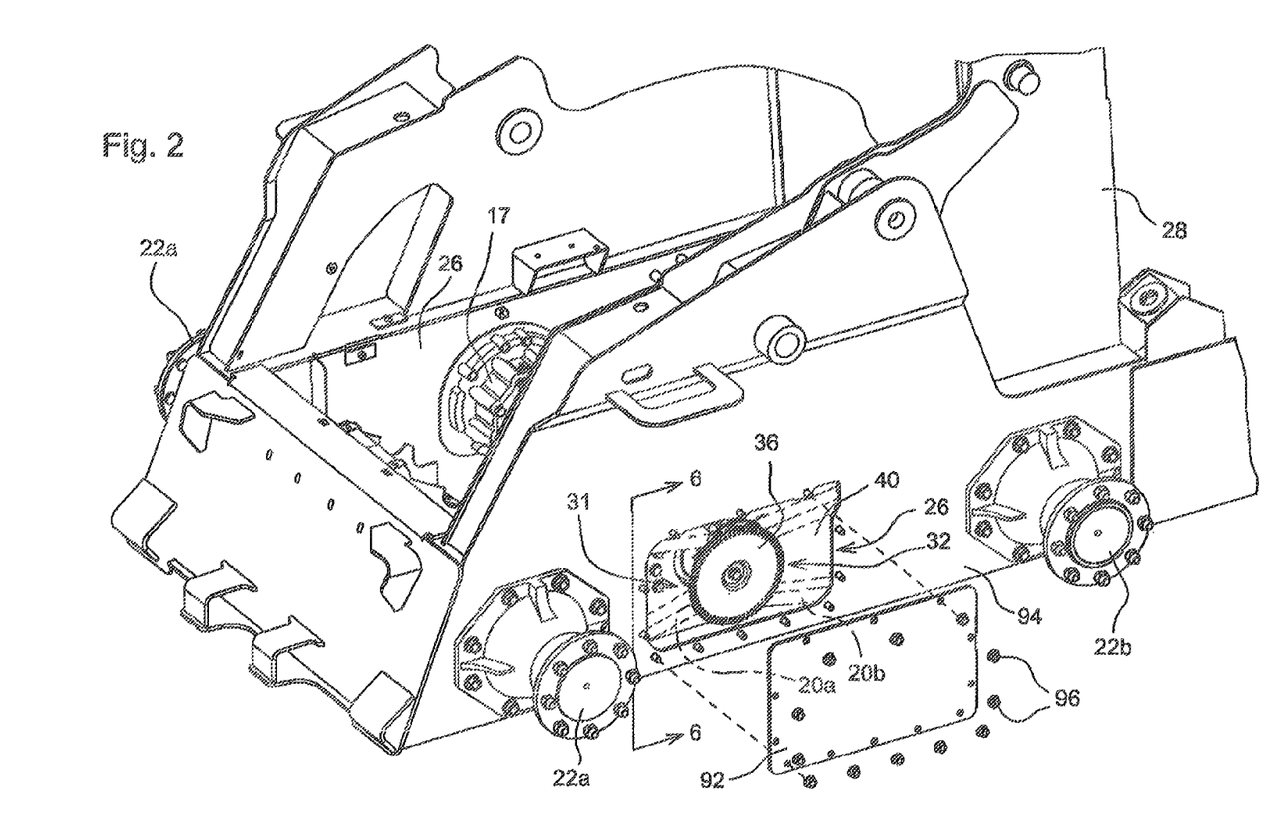
FIG. 2 is a perspective view showing the two chains diagrammatically and the sensor unit through an opening in the chain case upon removal of a panel thereof.

Referring to FIG. 2, each chain drive is located inside a respective chain case 26 enclosing the chains 20*a*, 20*b* of that chain drive. The chain case 26 is integrated into or otherwise mounted to the frame 28 of the vehicle 10 and contains a lubricant (e.g., 10W30 oil) for lubricating the chains 20*a*, 20*b* therein. The chains 20*a*, 20*b* are trained about respective sprockets 30*a*, 30*b* rotated by the output shaft 18 (FIG. 3), i.e., chain 20*a* is trained about sprocket 30*a*, and chain 20*b* is trained about sprocket 30*b*.

Referring to FIGS. 3-6, the vehicle 10 has a motor shaft speed sensor arrangement 31 located inside the chain case 26. The arrangement 31 includes a mount 51, located inside the chain case 26, and a sensor unit 32, mounted inside the chain case 26 by use of the mount 51 and arranged to sense a speed of rotation of the output shaft 18 of each of the motors 17. This shaft rotation speed may be provided to a controller (not shown) for use in controlling the vehicle 10. Since the sensor units 32 on each side of the vehicle 10 may be constructed in a manner similar to one another, the structure and function associated with only one of the sensor units 32 is discussed in this section of the present disclosure.

Figure 6:
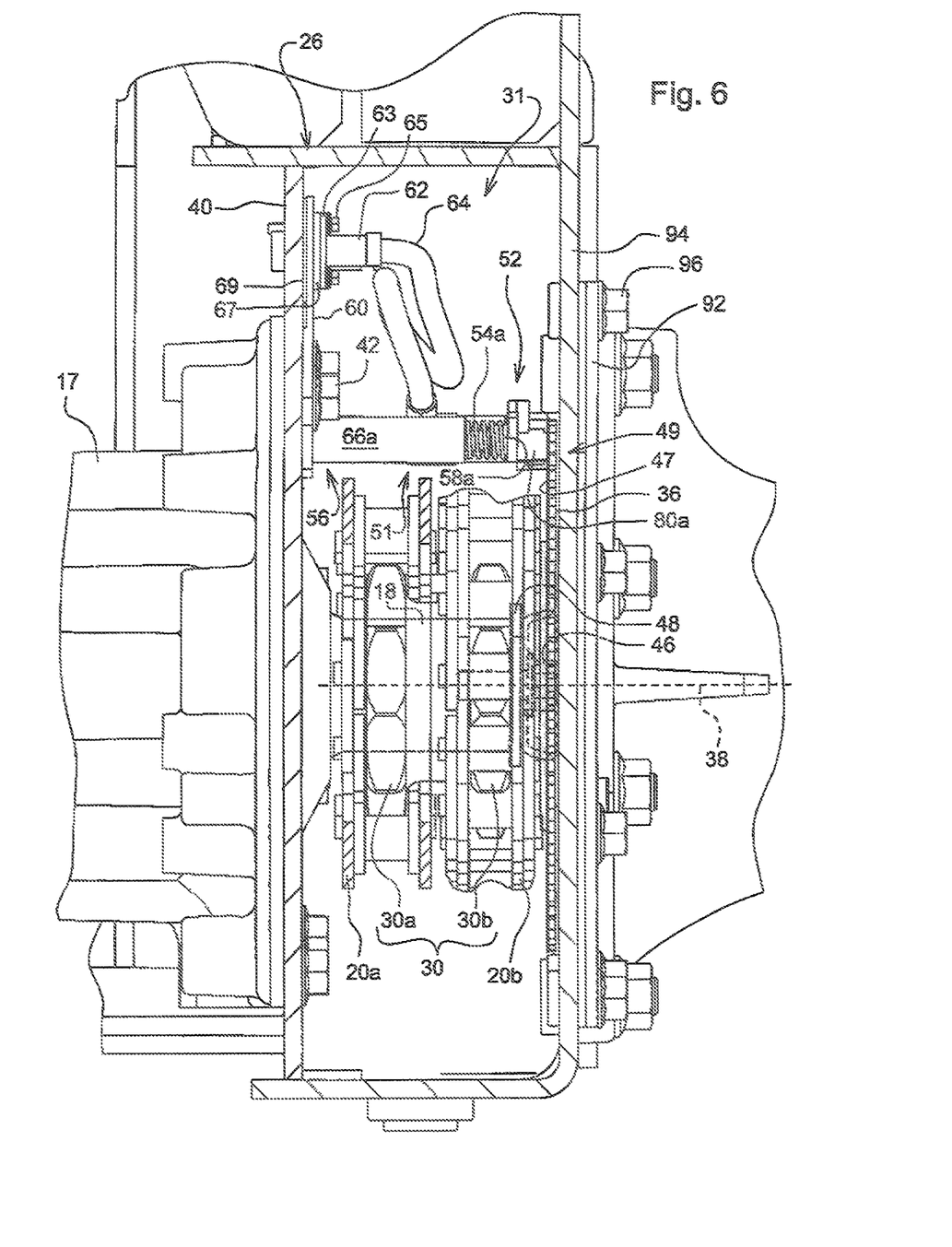
FIG. 6 is a sectional view taken along lines 6-6 of FIG. 2, with portions removed.

The sensor unit 32 is located inside the chain case 26, as shown, for example, in FIGS. 2 and 6. It may be located here due to a lack of sufficient space in the motor 17, or possibly for some other reason. The sensor unit 32 has a magnetic speed sensor 34 and a rotary sensor target 36. The sensor target 36 is located inside the case 26 and mounted to the output shaft 18 for rotation therewith. The speed sensor 34 is also located inside the case, to sense a speed and direction of rotation of the sensor target 36 about a rotation axis 38 of the output shaft 18. Such speed of rotation of the sensor target 36 is indicative of the speed of rotation of the output shaft 18 about its rotation axis 38. The speed sensor 34 may be, for example, a Hall-effect speed sensor having two Hall-effect chips for sensing the speed and direction of rotation of the target 36, and thus the output shaft 18. The sensor 34 is, for example, a Hall-effect magnetic quadrature speed sensor, which provides signals indicative of both shaft speed and direction of rotation, such as model HS Dual 5V ESD3 available from Parker Sensor Business Unit of Mishawaka, Ind. (also Deere Part No. AT342623 of Deere & Company, Moline, Ill.).

Figure 3:
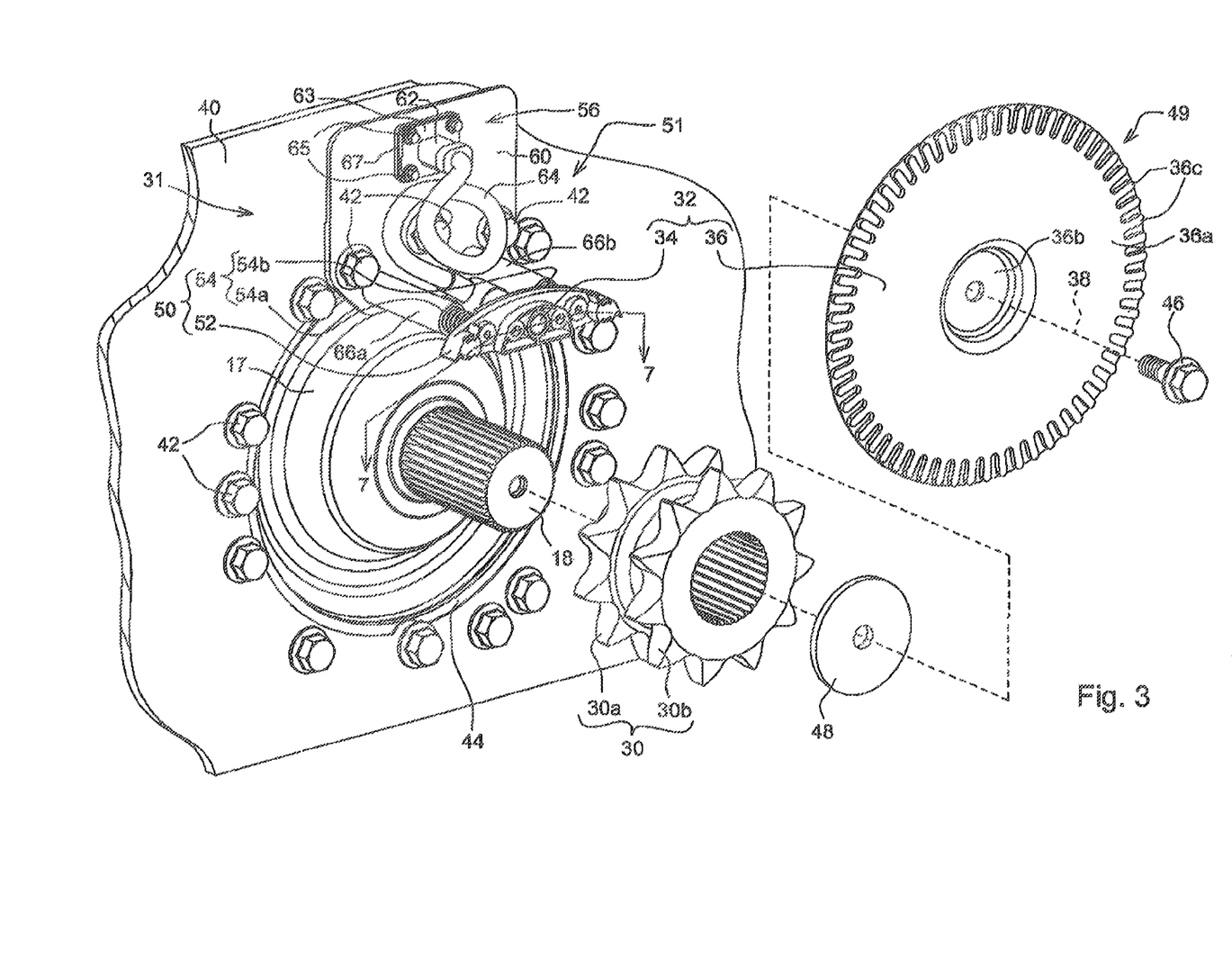
FIG. 3 is an exploded perspective view showing a magnetic speed sensor mounted to a wall of the chain case and rotary sensor target to be mounted to the output shaft of the motor for rotation therewith.
Figure 4:
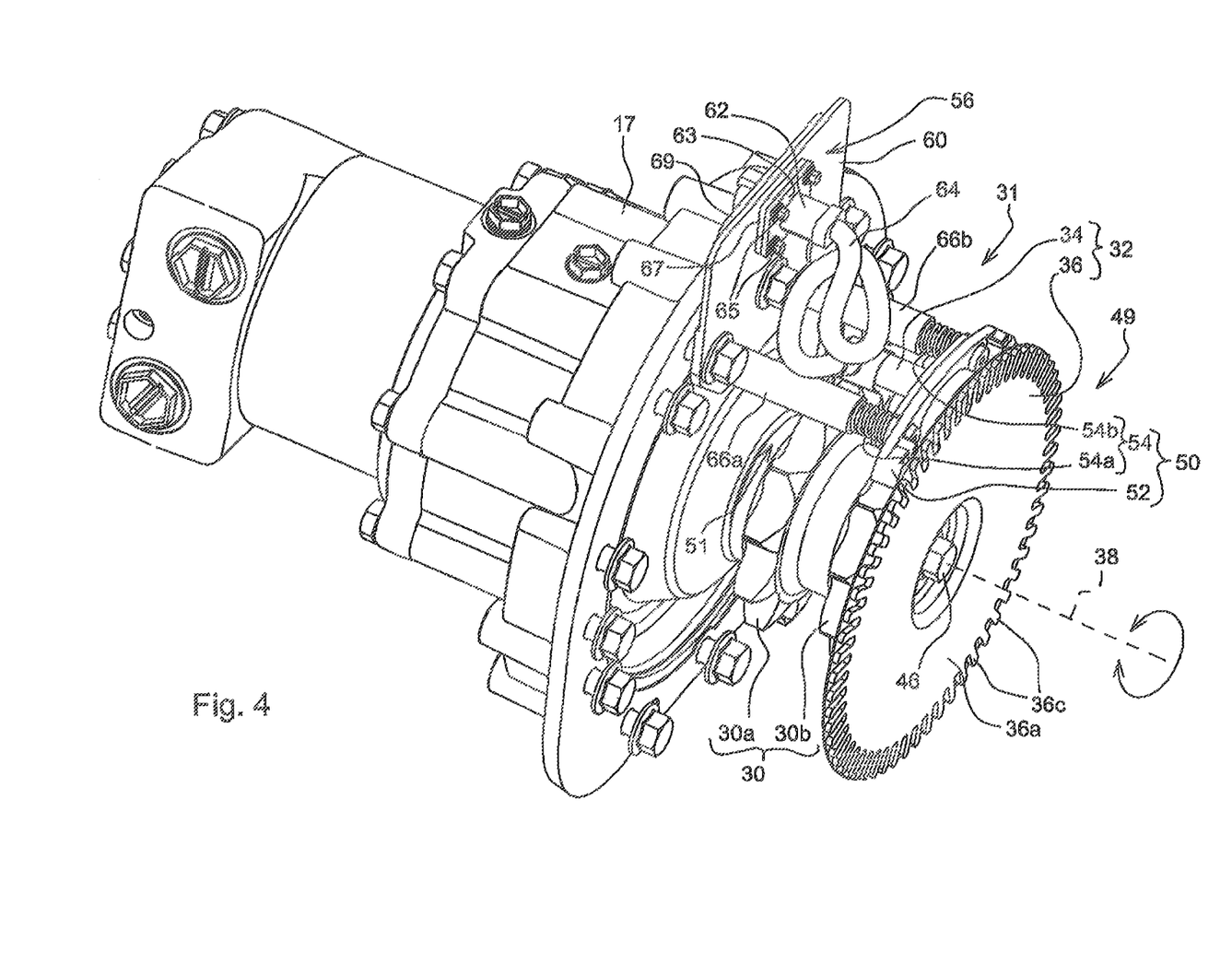
FIG. 4 is a perspective view showing an adjustment device arranged to adjust the position of the speed sensor relative to the sensor target automatically.

Referring to FIGS. 3 and 6, the motor 17 is mounted to an inboard wall 40 of the chain case 26 by use of a number of mechanical fasteners 42 and extends through an through-hole 44 defined in the wall 40. As such, a portion of the motor 17 (e.g., at least a portion of the hydraulic section) is located outside the case 26, whereas at least a portion of the output shaft 18 is located inside the case 26. The two sprockets 30*a*, 30*b*, configured, for example, as a one-piece sprocket unit 30, are mounted to (e.g., splined onto) the output shaft 18 inside the case 26.

The sensor target 36 is attached to an outboard end of the output shaft 18 by use of a mechanical fastener 46 for rotation with the shaft 18. The target 36 may be configured as one-piece structure made of, for example, steel. The target 36 is configured, for example, as a disc having an annular flange 36*a* and a hub 36*b*. The flange 36*a* may have teeth 36*c* formed therein (e.g., stamped, thermo cut, machined, etc.) about the periphery of the flange 36*a*. A spacer 48 (e.g., spacer disc) is located between the sprocket unit 30 and the hub 36*b* of the target 36, and the fastener 46 extends through the hub 36*b* and the spacer 48 into the outboard end of the shaft 18 so as to be threaded therein. The sprockets 30*a*, 30*b* and the target 36 are thus joined in this exemplary manner to the output shaft 18 for rotation therewith.

The sensor target 36 and an overlay in the form of, for example, a sheet 47 mounted on an inboard side of the flange 36*a* cooperate to provide a rotor 49. As such, the rotor 49 is mounted to the output shaft 18 for rotation therewith. The sheet 47 is discussed in more detail below.

Figure 7:
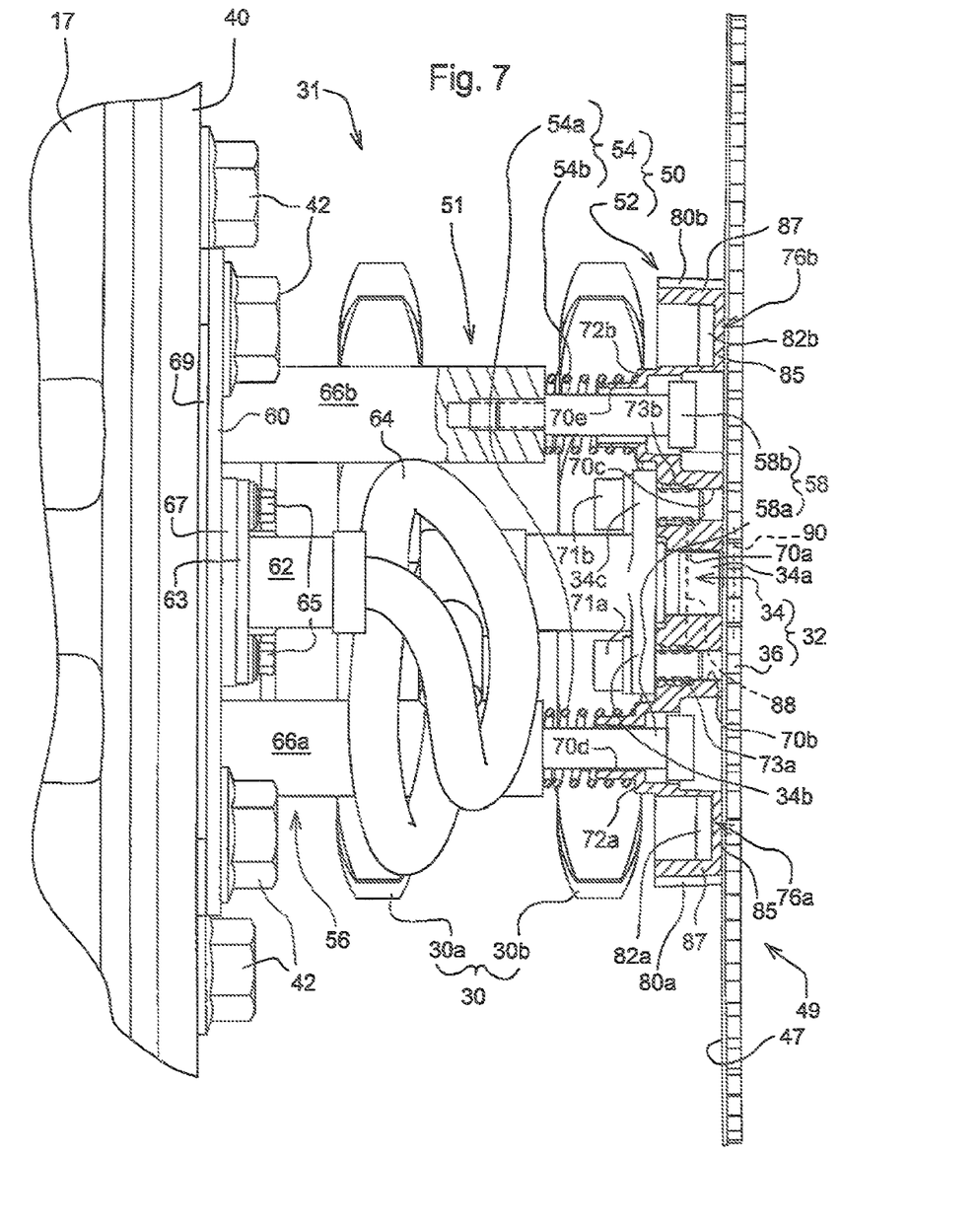
FIG. 7 is a sectional view taken along lines 7-7 of FIG. 3.

Referring to FIG. 7, the sensor 34 is mounted in close proximity to the target 36 in order to sense the fluctuations in the magnetic field of the sensor 34 due to passage of the teeth 36*a* and the gaps defined therebetween in the vicinity of the sensor 34 upon rotation of the target 36. An adjustment device 50 is arranged to adjust the position of the speed sensor 34 relative to the sensor target 36 automatically, so as to position the sensor 34 properly relative to the target 36 in order to obtain accurate readings from the target 36. Such automatic adjustment of the location of the sensor 34 is particularly useful since the sensor 34 is located in an area that is somewhat inconvenient to access. Further, such automatic adjustment of the sensor location minimizes maintenance time and expenses associated with the arrangement 31. The arrangement 31 is thus "self-adjusting."

The adjustment device 50 is attached to the mount 51 and has a carrier 52 and a biasing device 54. The carrier 52 carries the sensor 34 and may be a one-piece structure made by, for example, injection molding. The biasing device 54 urges the carrier 52 to move the sensor 34 toward the target 36. In particular, the biasing device 54 urges the carrier 52 to move toward the target 36, and thus urges the sensor 34 to do so as well. The biasing device 54 is located, and acts, between a mounting bracket 56 of the mount 51 and the carrier 54. The mounting bracket 56 is located inside, and is mounted to, the case 26 by use of mechanical fasteners 42. Illustratively, the mounting bracket 56 is mounted to the inboard wall 40. A carrier rotation blocker 58 of the mount 51 blocks rotation of the carrier 52 relative to the mounting bracket 56, which might otherwise by induced by rotation of the target 36.

Referring to FIGS. 3-7, the mounting bracket 56 is shown. The mounting bracket 56 has a plate 60 that is attached to the case wall 40 by use of mechanical fasteners 42. An electrical connector 62 is mounted to the plate 60 and extends through the wall 40 for connection with a mating electrical component to transmit signals indicative of shaft rotation speed and direction of rotation and provided by the sensor 34 via wiring 64 interconnecting the sensor 34 and the electrical connector 62.

The electrical connector 62 is mounted to the plate 60. A smaller plate 63 disposed about and integral with (or, alternatively, distinct from) the connector 62 is attached to plate 60 by use of mechanical fasteners 65, with a gasket 67 located between the plates 60, 63 to establish a sealed connection therebetween. A gasket 69 is located between the plate 60 and the wall 40 to establish a sealed connection therebetween. Gasket 67 may be made of any typical gasket material. Gasket 69 should be an easily compressed material, such as a cork-based gasket.

The mounting bracket 56 has first and second pegs 66a, 66b mounted to the plate 60 (e.g., by welding) and extending therefrom in a cantilevered fashion. The free end of each peg 66a, 66b has an internally threaded hole Referring to FIG. 7, the sensor 34 is carried by the carrier 52. The head 34a of the sensor 34 is received in a through-hole 70a of the carrier 52. Side flanges 34b, 34c of the sensor 34 are secured to the carrier 52 by use of mechanical fasteners 71a, 71b received in inserts 73a, 73b respectively molded into through-holes 70b, 70c of the carrier 52. The inserts 73a, 73b may be made of, for example, brass.

The carrier rotation blacker 58 has first and second posts 58a, 58b located on opposite sides of the sensor 34. The posts 58a, 58b are attached to first and second pegs 66a, 66b of the mounting bracket 56. The pegs 66a, 66b are fixed to the plate 60 by, for example, welding.

Each post 58a, 58b is configured, for example as a shoulder bolt having a shank and a head attached to an end of the shank. During assembly, the shanks of the posts 58a, 58b are passed through respective through-holes 70d, 70e of the carrier 52, located on opposite sides of the through-hole 70a, and are threaded into respective ends of the pegs 66a, 66b, as shown, for example, in FIG. 7 with respect to post 58b and peg 66b. Because the head of each post 58a, 58b is too large to pass through the through-holes 70d, 70e, the posts 58a, 58b retain the carrier 52 on the posts 58a, 58b during assembly. Further, although the carrier 52 is allowed to slide longitudinally along the shanks of the posts 58a, 58b, the posts 58a, 58b cooperate to block rotation of the carrier 52 relative to the mounting bracket 56.

Figure 9:
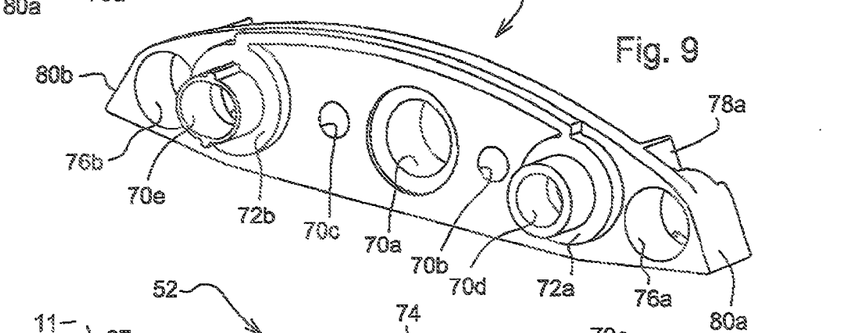
FIG. 9 is another perspective view of the carrier.
Figure 10:
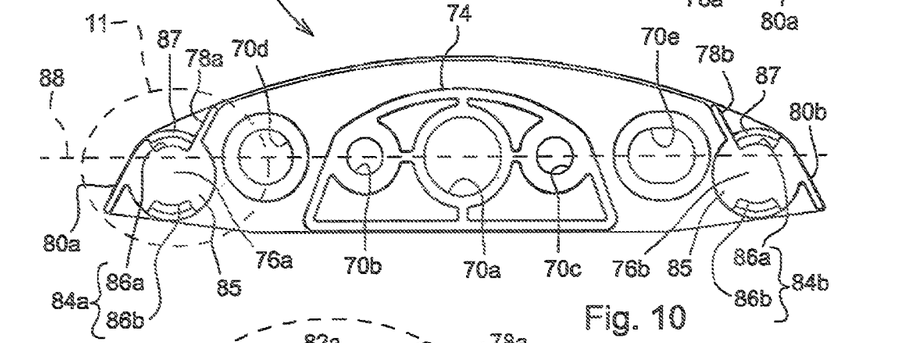
FIG. 10 is an elevation view of the carrier.

Illustratively, the through-holes 70d, 70e have different shapes, as shown, for example, in FIGS. 9 and 10. The through-hole 70d may be circular, and the through-hole may be oval to accommodate tolerance stack-up.

The biasing device 54 includes, for example, two springs 54a, 54b. The posts 58a, 58b are passed through the springs 54a, 54b, respectively, during assembly. As such, the spring 54a surrounds the post 58a and is captured between the free end of the peg 66a of the mounting bracket 56 and a shoulder 72a of the carrier 52, and the spring 54b surrounds the post 58b and is captured between the free end of the peg 66b of the mounting bracket 56 and a shoulder 72b of the carrier 52. The springs 54a, 54b are thus located on opposite sides of the sensor 34.

The springs 54a, 54b cooperate to yieldably urge the carrier 52 against the rotor 49 away from the mounting plate 60. Even though some lubricant may come between the contact surfaces of the carrier 52 and the rotor 49, the carrier 52 is still considered to be "against" the rotor 49. As alluded to above, the rotor 49 may have a wear-resistant sheet 47 provided on the inboard side of the flange 36a. In such a case, the springs 54a, 54b yieldably urge the contact surfaces of the carrier 52 against a surface of the sheet 47 between the carrier 52 and the target 36.

Figure 5:
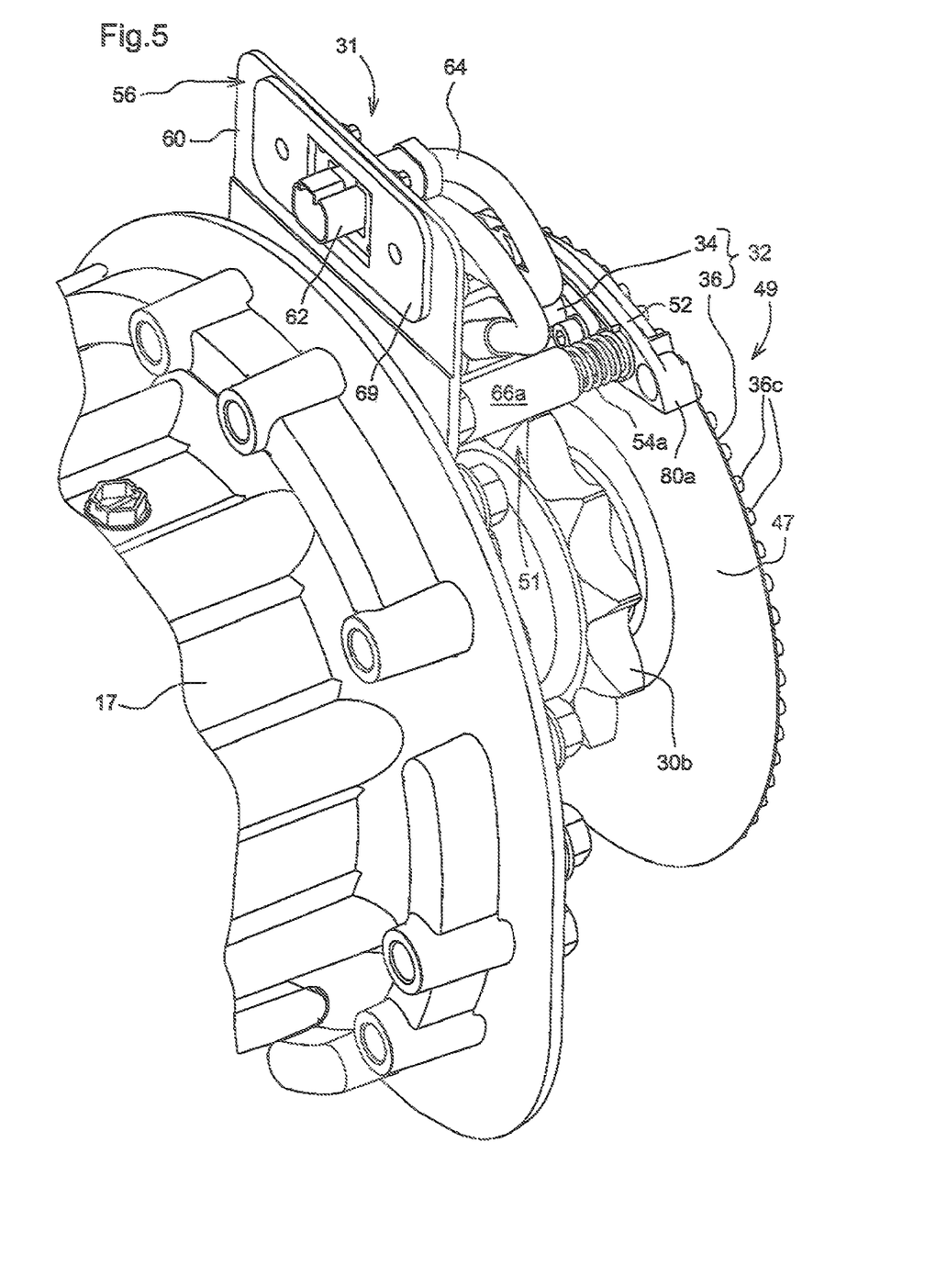
FIG. 5 is a perspective view showing a carrier of the adjustment device which carries the speed sensor and is urged against a surface of a sheet, mounted on the sensor target, by use of a biasing device of the adjustment device.

Referring to FIGS. 5-7, the wear-resistant sheet 47 is an example of an overlay or other wear-resistant component provided on the inboard side of the flange 36a. The sheet 47 may be mounted to the inboard side of the flange 36a by an adhesive. Alternatively, the sheet 47 may be attached to the inboard side of the flange 36a by other means, such as, for example, by use of mechanical fasteners or overmolding of the material of the sheet 47 onto the flange 36a Illustratively, the sheet 47 is annular in shape so as to surround the hub 36b and span the radial distance of the flange 36a from the hub 36b to the periphery of the flange 36a behind the teeth 36c.

The carrier 52 and the sheet 47 cooperate to maintain the tip of the sensor head 34a within a predetermined distance, or predetermined sensor gap, from the target 36 to promote the accuracy of the readings of the sensor 34. The value of the predetermined sensor gap is a function of the particular sensor implemented. Exemplarily, as mentioned above, the sensor 34 is a Hall-effect magnetic quadrature speed sensor, such as model HS Dual 5V ESD3 available from Parker Sensor Business Unit of Mishawaka, Ind. (also Deere Part No. AT342623 of Deere & Company, Moline, Ill.), in which case the predetermined sensor gap is 1.2 millimeters. The relative contributions of the carrier 52 and the sheet 47 to the distance of the tip of the sensor head 34a from the target 36 is determined based on the materials selected for the carrier 52 and the sheet 47.

The carrier 52 and the sheet 47 may made of different materials, to prevent them from fusing together due to heating from friction therebetween (e.g., if the level of lubricant in the case 26 becomes low), thereby prolonging the service life of the arrangement 31. Further, the materials of the carrier 52 and the sheet 47 are selected to promote wear resistance. The wear characteristics of the materials of the carrier 52 and sheet 47 are matched to achieve a balanced life between the carrier 52 and the sheet 47 (i.e., the material of one component does not cause the material of the other component to wear excessively prematurely).

For example, the carrier 52 may be made of black acetal as a one-piece structure formed by injection molding, and the sheet 47 may be made of a relatively low-friction material such as, for example, molybdenum-impregnated nylon. Both the black acetal and molybdenum-impregnated nylon exhibit wear resistance, although the black acetal is more wear resistant than the molybdenum-impregnated nylon. In addition, the black acetal and the molybdenum-impregnated nylon have self-lubricating properties, which address operation, for example, at relatively high ambient temperatures and relatively low lubricant viscosity conditions.

The materials of the carrier 52 and the sheet 47 may wear at rates different from one another. For example, the sheet 47 may wear at a faster rate than the carrier 52; the wear rate ratio between the molybdenum-impregnated nylon sheet 47 and the black acetal may be 2:1.

In view of the differing wear rates of the carrier 52 and the sheet 47, the sheet 47 is thicker than the portion of the carrier 52 between the tip of the sensor head 34a and the sheet 47. For example, initially (i.e., at the time of assembly before wear), the sheet 47 has a thickness of, for example, about 0.8 millimeters, and the portion of the carrier 52 between the tip of the sensor head 34a and the sheet 47 has a thickness of, for example, about 0.4 millimeters, so that the initial sensor gap between the tip of the sensor head 34a and the target 36 is about 1.2 millimeters. Upon wear of either the carrier 52 or the sheet 47, the biasing device 54 continues to urge the carrier 52 against the sheet 47, thereby urging the carrier 52, and thus the sensor 34, to move toward the sensor target 36.

As discussed in more detail below, the carrier 52 has a wiper unit configured to wipe the sheet 47 of heavy (i.e., thick) lubricant films, leaving a light (i.e., thin) lubricant film on the sheet 47 between the contact surfaces of the carrier 52 and the sheet 47. Exemplarily, the thickness of this light lubricant film left on the sheet 47 is only about 0.003 inch or less and therefore considered to be negligible vis-à-vis maintaining the tip of the sensor head 34a within the predetermined sensor gap.

Figure 8:
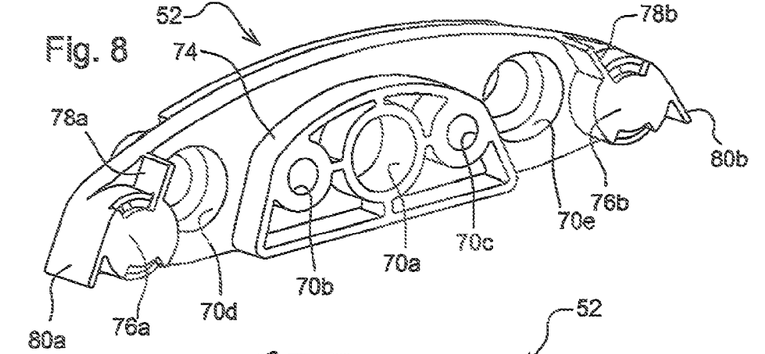
FIG. 8 is a perspective view of a carrier of the adjustment device.

Referring to FIGS. 8 and 10, the carrier 52 has a number of contact surfaces which are pressed against the sheet 47 by the springs 54a, 54b, maximizing the service life of the carrier 52. The contact surfaces include each of the barrels that define the through-holes 70a, 70b, and 70c, a D-shaped wall 74 surrounding those barrels, the end faces of first and second pockets 76a, 76b, and members 78a, 78b, 80a, 80b.

Referring back to FIG. 7, permanent first and second debris magnets 82a, 82b are located in the case 26 and carried by the carrier 52 to attract metallic debris in the case 26 (e.g., metal pieces from the chains 20a, 20b and sprockets 30a, 30b) to protect the sensor 34 from such debris, which could otherwise be attracted by the magnet(s) of the sensor 34 and diminish the effectiveness of the sensor 34. Each magnet 82a, 82b may be made of, for example, nickel-plated neodymium.

The first pocket 76a contains the first magnet 82a, and the second pocket 76b contains the second magnet 82b. Each magnet 82a, 82b is shaped as a disc, press fit into the respective pocket 76a, 76b. The pockets 76a, 76b, and thus the magnets 82a, 82b, are located on opposite sides of the sensor 34 outward of the through-holes 70d, 70e relative to the sensor 34.

Figure 11:
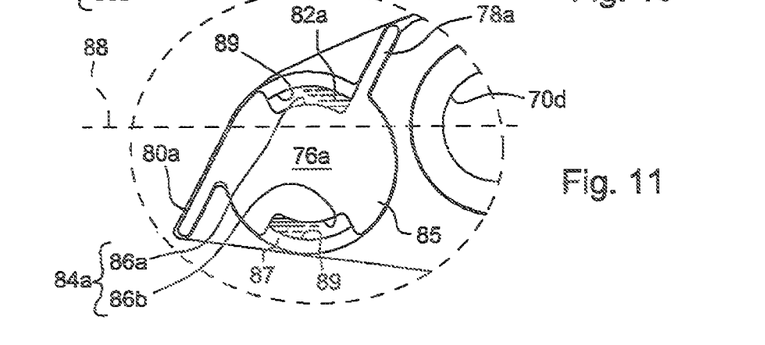
FIG. 11 is an enlarged elevation view of region 11 of FIG. 10 with a debris magnet now installed in a pocket of the carrier.

Referring to FIGS. 10 and 11, the carrier 52 includes debris receptacles 84a, 84b respectively associated with the magnets 82a, 82b to collect debris attracted thereby. The outer surface of the end wall 85 of each pocket 76a, 76b is formed to include first and second debris-collecting notches 86a, 86b located on opposite sides of a longitudinal axis 88 of the carrier 52 to promote collection of debris therein. The depth of each notch 82a, 82b is such that the end wall 85 of a pocket 76a, 76b cooperates with the side wall 87 of that pocket so as to define an opening 89 therebetween exposing a portion of the respective magnet 82a, 82b.

The carrier 52 has fins or walls 78a, 78b. Fins 78a, 78b respectively extend from notches 86a radially outward from the pockets 76a, 76b. Fins 78a, 78b provide contact surfaces urged against the sheet 47, stiffen the end regions of the carrier 52, and help to block debris from reaching the sensor 34 for collection in the notches 86a and on the outer surfaces of the side walls 87.

Debris attracted by the magnets 82a, 82b is collected about the magnets 82a, 82b. In particular, debris may be collected in the notches 86a, 86b and may also be collected around the outer surface of the side walls 87 of the pockets 76a, 76b. The carrier 52 is thus configured to catch and retain metallic debris in the case 26 to protect the sensor 34 and prevent recirculation of the debris within the case 26.

The chain case 26 may be subject to wide extremes of ambient temperature, affecting the viscosity, or thickness, of the lubricant (e.g., oil) in the chain case 26. The sheet 47 may thus be exposed to heavier (i.e., thicker) lubricant films in colder temperatures and lighter (i.e., thinner) lubricant films in warmer temperatures.

The carrier 52 has a wiper unit including first and second wipers 80a, 80b that wipe the sheet 47 of the rotor 49. In so doing, the wipers 80a, 80b minimize the thickness of any lubricant film on the sheet 47, and thus the variation of such thickness on the sheet 47, which could otherwise vary the sensor gap to an extent that distorts the speed readings supplied by the sensor 34. Moreover, the wipers 80a, 80b wipe heavy lubricant film from the surface of the sheet 47, allowing the carrier 52 to remain against the sheet 47 when the lubricant is relatively cold to maintain a proper sensor gap between the sensor tip and the target 36, and thus proper positioning of the sensor 34 relative to the target 36. However, a thin film of lubricant will be present between the carrier 52 and the sheet 47, minimizing wear on the carrier 52 and sheet 47 and prolonging the service life of the arrangement 31. As alluded to above, even with this thin film of lubricant present between the carrier 52 and the sheet 47, for purposes of the present disclosure, the carrier 52 is still considered to be "against" the sheet 47.

Further, the first and second wipers 80a, 80b divert material away from the sensor 34, for protection of the sensor 47. They direct material on the sheet 47 toward the outer diameter of the flange 36a so as to move any magnetic or abrasive wear material away from the sensor 34 and the carrier 52 and allow the carrier 52 to stay against the sheet 47. The spring load of the springs 54a, 54b is sized so as to be heavy enough to wipe off a heavy lubricant film and maintain the carrier 52 against the sheet 47 during shock load conditions and light enough to minimize wear and promote service life longevity. The spring constant (or spring rate) of each spring 54a, 54b is, for example, 1.1 pounds/inch.

The wipers 80a, 80b are oriented to direct material toward the outer surfaces of the side walls 87 of the pockets 76a, 76b and the notches 86a thereof. Illustratively, each wiper 80a, 80b is shaped as a fin or wall that extends from a pointed end of the carrier 52 to the outer surface of the side wall 87 of the respective pocket 76a, 76b. The wipers 80a, 80b are thus located on opposite sides of the sensor 34 outward of the pockets 76a, 76b relative to the sensor 34.

The carrier 52 is thus configured and arranged relative to the rotor 49 so as to attract and collect metallic debris and wipe the rotor 49 in both directions of rotation of the output shaft 18 about axis 38. In particular, the longitudinal axis 88 of the carrier 52 is generally parallel to a tangent 90 of an imaginary circle defined by a radius of the flange 36a, as shown, for example, in FIG. 7. Further, the carrier 52 is configured, for example, so as to have a marquis shape with pointed ends and a wider longitudinally central portion. As alluded to above, the wipers 80a, 80b extend from the pointed ends of the carrier 52 so as to slope along the perimeter of the carrier 52 outwardly from the axis 88. The debris magnets 82a, 82b are positioned just inwardly from the wipers 80a, 80b, relative to the sensor 34, to attract metallic debris diverted by the wipers 80a, 80b for collection on the outer surface of the side walls 87 of the pockets 76a, 76b and in the debris receptacles 84a, 84b, before such debris reaches the tip of the sensor head 34a. Although some debris may reach the tip of the sensor head 34a over time, the amount that manages to reach the tip of the sensor head 34a is minimized.

The configuration of the arrangement 31 is believed to promote a relatively long maintenance-free service life of the arrangement 31 (e.g., 5000 hours), promoting uptime of the vehicle 10 and minimizing maintenance expenses associated with the arrangement 31. In the event that maintenance is needed, an access panel 92 (FIGS. 2 and 6) on an outboard wall 94 of the case 26 may be temporarily unfastened (by removal of mechanical fasteners 96) and removed, allowing access to the arrangement 31 inside the case 26 through an opening in the wall 94.

The motor shaft speed sensed by the speed sensor 34 may be used by the vehicle 10 in any number of ways. The vehicle 10 may have an electro-hydraulic system for controlling functions of the vehicle 10. The electronic control system of the electro-hydraulic system may use the shaft speeds to monitor the tracking of the vehicle 10. If the control system determines that the vehicle 10 is not travelling straight (within a predetermined tolerance) based on a comparison of the motor shaft speeds using the signals from the sensors 34 despite a request for straight travel from the left and right operator input devices (e.g., they are in their neutral positions as indicated by signals from them to the control system), the control system may cease propulsion of the vehicle 10 by outputting one or more control signals to the pumps 16 (i.e., the pump control units of the pumps 16) to shut down hydraulic flow from the pumps 16. The motor shaft speed sensor arrangement 31 may thus be used in an electro-hydraulic system that controls propulsion and steering of the vehicle 10.

As mentioned above, the sensor 34 may be a magnetic speed sensor configured to detect both speed and direction of rotation of target 36, as well as a zero speed of the target 36. Alternatively, a passive proximity sensor may be used in place of the magnetic speed sensor as the sensor 34. In such a case, the proximity sensor may have a coil of wire, and the sensor target may be configured like the target 36 described above except that the target would be a ferrite material so as to generate an electrical current in the coil of wire upon rotation of the target, the current being indicative of the speed of rotation of the target and thus the shaft 18. The arrangement 31 can be used to position properly either type of sensor, magnetic or passive proximity, relative to the respective sensor target automatically.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work vehicle, comprising:
   a case,
   a motor comprising a portion located outside the case and a rotatable output shaft,
   a rotary sensor target located inside the case and mounted to the output shaft for rotation therewith about a rotation axis of the output shaft,
   a speed sensor located inside the case to sense a speed of rotation of the sensor target, such speed of rotation of the sensor target being indicative of a speed of rotation of the output shaft, and
   an adjustment device arranged to adjust the position of the speed sensor axially toward the sensor target automatically relative to the rotation axis.

2. The work vehicle of claim 1, wherein the adjustment device is arranged to adjust the position of the speed sensor toward the sensor target automatically, the adjustment device comprises a spring, the adjustment device comprises another spring, and the springs are located on opposite sides of the speed sensor.

3. The work vehicle of claim 1, wherein the adjustment device comprises a carrier carrying the speed sensor and a biasing device urging the carrier to move the speed sensor toward the sensor target.

4. The work vehicle of claim 3, comprising a mounting bracket located inside, and mounted to, the case, wherein the biasing device is captured between the mounting bracket and the carrier, the biasing device comprises a spring captured between the mounting bracket and the carrier, the biasing device comprises another spring captured between the mounting bracket and the carrier, and the springs are located on opposite sides of the speed sensor.

5. The work vehicle of claim 3, comprising a debris magnet, wherein the speed sensor is a magnetic speed sensor, the debris magnet is located in the case to attract debris to protect the speed sensor from such debris, and the carrier carries the debris magnet.

6. The work vehicle of claim 5, wherein the carrier comprises a debris receptacle associated with the debris magnet for collecting debris attracted thereby.

7. The work vehicle of claim 5, wherein the carrier comprises a pocket containing the debris magnet therein.

8. The work vehicle of claim 7, wherein the pocket comprises a debris-collecting notch formed in an outer surface of the pocket, and the carrier comprises a fin extending from the debris-collecting notch radially outward away from the pocket.

9. The work vehicle of claim 8, comprising a rotor, wherein the rotor is mounted to the output shaft to rotate therewith and comprises the sensor target, the carrier comprises a wiper that wipes the rotor and extends to the outer surface of the pocket.

10. The work vehicle of claim 3, comprising a rotor, a mounting bracket located inside, and mounted to, the case, and a carrier rotation blocker blocking rotation of the carrier relative to the mounting bracket, wherein the rotor is mounted to the output shaft to rotate therewith and comprises the sensor target, the carrier comprises a first wiper and a second wiper, the first wiper wipes the rotor to divert material away from the speed sensor and extends to the outer surface of the first pocket, the second wiper wipes the rotor to divert material away from the speed sensor and extends to the outer surface of the second pocket, the carrier rotation blocker comprises a first post attached to the mounting bracket and a second post attached to the mounting bracket, the biasing device comprises a first spring and a second spring, the carrier comprises a first through-hole in which the speed sensor is located, a second through-hole, and a third through-hole, the second and third through-holes are located on opposite sides of the speed sensor, the first post extends through the second through-hole and the first spring to the mounting bracket, the second post extends through the second through-hole and the second spring to the mounting bracket, the first and second pockets are located outward of the second and third through-holes relative to the speed sensor, and the first and second wipers are located outward of the first and second pockets relative to the speed sensor.

11. The work vehicle of claim 3, comprising a rotor, wherein the rotor is mounted to the output shaft to rotate therewith and comprises the sensor target, and the carrier comprises a wiper that wipes the rotor.

12. The work vehicle of claim 11, wherein the wiper is a first wiper, the carrier comprises a second wiper that wipes the rotor, and the first and second wipers are located on opposite sides of the speed sensor.

13. The work vehicle of claim 3, wherein the carrier has a marquis shape.

14. The work vehicle of claim 1, wherein the case is a chain case enclosing a chain, and the output shaft is drivingly coupled to the chain.

15. A work vehicle, comprising:
   a case,
   a motor comprising a portion located outside the case and a rotatable output shaft,
   a rotary sensor target located inside the case and mounted to the output shaft for rotation therewith about a rotation axis of the output shaft,
   a speed sensor located inside the case to sense a speed of rotation of the sensor target, such speed of rotation of the sensor target being indicative of a speed of rotation of the output shaft, an adjustment device arranged to adjust the position of the speed sensor axially toward the sensor target automatically relative to the rotation axis, wherein the adjustment device comprises a carrier carrying the speed sensor and a biasing device urging the carrier to move the speed sensor toward the sensor target, a mounting bracket located inside, and mounted to, the case, wherein the biasing device is captured between the mounting bracket and the carrier, the biasing device comprises a spring captured between the mounting bracket and the carrier, the biasing device comprises another spring captured between the mounting bracket and the carrier, and the springs are located on opposite sides of the speed sensor, and a carrier rotation blocker blocking rotation of the carrier relative to the mounting bracket and a rotor mounted to the output shaft for rotation therewith, wherein the rotor comprises the sensor target and a sheet provided on an annular flange of the sensor target, the carrier rotation blocker comprises a first post and a second post, the biasing device comprises a first spring and a second spring, the carrier defines a first through-hole and a second through-hole which are located on opposite sides of the speed sensor, the first post extends through the first through-hole and the first spring to the mounting bracket and is attached to the mounting bracket, the second post extends through the second through-hole and the second spring to the mounting bracket and is attached to the mounting bracket, and the first and second springs are configured to move the carrier along the first and second posts upon wear of the carrier or the sheet.

16. A work vehicle, comprising:

a case, a motor comprising a portion located outside the case and a rotatable output shaft, a rotary sensor target located inside the case and mounted to the output shaft for rotation therewith about a rotation axis of the output shaft, a speed sensor located inside the case to sense a speed of rotation of the sensor target, such speed of rotation of the sensor target being indicative of a speed of rotation of the output shaft, an adjustment device arranged to adjust the position of the speed sensor axially toward the sensor target automatically relative to the rotation axis, wherein the adjustment device comprises a carrier carrying the speed sensor and a biasing device urging the carrier to move the speed sensor toward the sensor target, and a rotor mounted to the output shaft for rotation therewith, wherein the rotor comprises the sensor target and a surface located between the carrier and the sensor target, the biasing device urges the carrier against the surface, the sensor target is configured as a disc, the surface is included in a sheet provided on the disc, the carrier is made of a first material, the sheet is made of a second material different from the first material, and the second material is configured to wear at a rate faster than the first material.

17. A work vehicle, comprising:

a case, a motor comprising a portion located outside the case and a rotatable output shaft, a rotary sensor target located inside the case and mounted to the output shaft for rotation therewith about a rotation axis of the output shaft, a speed sensor located inside the case to sense a speed of rotation of the sensor target, such speed of rotation of the sensor target being indicative of a speed of rotation of the output shaft, an adjustment device arranged to adjust the position of the speed sensor axially toward the sensor target automatically relative to the rotation axis, wherein the adjustment device comprises a carrier carrying the speed sensor and a biasing device urging the carrier to move the speed sensor toward the sensor target, and a first debris magnet, wherein the speed sensor is a magnetic speed sensor, the first debris magnet is located in the case to attract debris to protect the speed sensor from such debris, and the carrier carries the first debris magnet, and a second debris magnet located in the case to attract debris to protect the speed sensor from such debris, wherein the carrier carries the second debris magnet, the first and second debris magnets are located on opposite sides of the speed sensor, the carrier comprises a first pocket containing the first debris magnet and a second pocket containing the second debris magnet, the first and second pockets are located on opposite sides of the speed sensor, each of the first and second pockets comprises a debris-collecting first notch and a debris-collecting second notch, and the first and second notches of each of the first and second pockets are formed in an outer surface of that pocket on opposite sides of a longitudinal axis of the carrier.

18. A work vehicle, comprising:

a case, a motor comprising a portion located outside the case and a rotatable output shaft, a rotor that is located inside the case and is mounted to the output shaft to rotate therewith, the rotor comprising a sensor target, a speed sensor located inside the case to sense a speed of rotation of the sensor target, such speed of rotation of the sensor target being indicative of a speed of rotation of the output shaft, and a wiper that is located inside the case and wipes a surface of the rotor extending radially relative to the rotation axis.

19. The work vehicle of claim 18, comprising a carrier carrying the speed sensor and comprises the wiper, wherein the wiper is a first wiper, the carrier comprises a second wiper that is located inside the case and wipes the rotor, and the first and second wipers are located on opposite sides of the speed sensor.

20. The work vehicle of claim 18, comprising a chain located inside the case, and the output shaft is drivingly coupled to the chain.

* * * * *